United States Patent
Ueno et al.

(10) Patent No.: US 7,057,855 B2
(45) Date of Patent: Jun. 6, 2006

(54) HEAD SLIDER WITH FLOTATION IMPROVING SECTION AND DISK DRIVE APPARATUS USING THE SAME

(75) Inventors: Yoshihiro Ueno, Osaka (JP); Tatsuhiko Inagaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 663 days.

(21) Appl. No.: 10/003,829

(22) Filed: Dec. 6, 2001

(65) Prior Publication Data
US 2002/0126418 A1   Sep. 12, 2002

(30) Foreign Application Priority Data
Dec. 7, 2000   (JP)   .............................. 2000-372632

(51) Int. Cl.
*G11B 5/60*   (2006.01)
(52) U.S. Cl. .................................................. 360/235.7
(58) Field of Classification Search ............. 360/235.7, 360/236.3, 236.5, 237
See application file for complete search history.

(56) References Cited

U.S. PATENT DOCUMENTS

| | | | | |
|---|---|---|---|---|
| 5,299,079 A | * | 3/1994 | Kuroda ..................... | 360/236.7 |
| 5,663,853 A | * | 9/1997 | Park ......................... | 360/236.4 |
| RE35,800 E | * | 5/1998 | Chapin ..................... | 360/235.7 |
| 5,959,805 A | * | 9/1999 | Kawasaki et al. ........ | 360/236.4 |
| 6,021,020 A | | 2/2000 | Itoh et al. ................. | 360/236.1 |
| 6,040,959 A | * | 3/2000 | Kobayashi et al. ...... | 360/236.7 |
| 6,040,965 A | * | 3/2000 | Terunuma et al. ......... | 360/122 |
| 6,181,519 B1 | * | 1/2001 | Kim ......................... | 360/236.6 |
| 6,216,529 B1 | * | 4/2001 | Burga et al. .................. | 73/105 |
| 6,288,874 B1 | | 9/2001 | Ito ........................... | 360/235.5 |
| 6,587,308 B1 | * | 7/2003 | Sannino et al. .......... | 360/236.3 |
| 6,639,756 B1 | * | 10/2003 | Ueda et al. .............. | 360/235.8 |
| 6,643,100 B1 | * | 11/2003 | Iwasaki ................... | 360/236.5 |
| 6,654,205 B1 | * | 11/2003 | O'Hara et al. ........... | 360/236.3 |
| 6,714,382 B1 | * | 3/2004 | Alexopoulos et al. ... | 360/235.8 |

FOREIGN PATENT DOCUMENTS

| | | | | |
|---|---|---|---|---|
| JP | 08045220 A | * | 2/1996 | |
| JP | 10-69748 | | 3/1998 | |
| JP | 11185418 A | * | 7/1999 | |
| JP | 11-328897 | | 11/1999 | |

* cited by examiner

*Primary Examiner*—Brian E. Miller
(74) *Attorney, Agent, or Firm*—Wenderoth, Lind & Ponack, L.L.P.

(57) ABSTRACT

A head slider has, on its front face opposing a disk, a positive pressure generating section and a negative pressure generating recess, and a sloped face slopping toward the air outlet side. By virtue of the sloped face, the negative pressure hindering with high-speed unloading operation of the head slider can be decreased quickly. Thus, at the time of unloading, an additional load is not necessary for the suspension, and the stroke of the suspension for raising the head slider can be shortened. Therefore, a disk drive which is thinner, smaller, and capable of high recording density can be realized.

20 Claims, 13 Drawing Sheets

Distance Along Length from Air Inlet End Section

Distance Along Length from Air Inlet End Section

Distance Along Length from Air Inlet End Section

Distance Along Length from Air Inlet End Section

HEAD SLIDER WITH FLOTATION IMPROVING SECTION AND DISK DRIVE APPARATUS USING THE SAME

FIELD OF THE INVENTION

The present invention relates to a head slider mounting a head for recording and playing back a signal on a disk-formed recording medium, such as a magnetic disk and an optical disk, and to a disk drive apparatus using the head slider.

BACKGROUND OF THE INVENTION

There have been great advances in apparatuses for recording and playing back signals on disk-formed recording media (hereinafter called "disk") such as hard disks and optical disks. For example, the recording density of a hard disk apparatus has been increasing at a rate of close to 100% every year. In order to increase the recording density further in years to come, it is required that the space between the disk surface on which signals are recorded and the head slider on which the head is mounted (i.e., the floating height) be decreased further. More concretely, a stable provision of a floating height below 20 nm is required.

One of the effective ways to stably provide such a micro floating height is to smoothen the disk surface.

As a mechanism for holding the head slider and allowing the same to perform floating operation in a disk drive, the mechanism of a Contact Start Stop (CSS) system is being widely used. The mechanism of the CSS system is such that the head slider is kept in contact with the surface of the disk at rest while the disk rotation is stopped and, when the disk is started to rotate for performing recording and playback, the head slider slides along the disk surface and finally reaches a predetermined floating height over the disk surface. In this floating state, the head mounted on the head slider performs recording or playback. Therefore, when a smooth-surfaced disk is used, the head slider adheres to the disk when the disk is stopped. Once such adhesion occurs, a disk rotating torque overcoming the adhesive force is needed. Hence, the apparatus requires a large driving electric power. If the adhesive force becomes too great, such an event can occur that normal startup becomes impossible. In order to prevent occurrence of such adhesion, bumps and dimps generally called "texture" are provided on the surface of the disk. Then, the head slider must have a floating height at least not causing the head slider to contact the bumps of the texture. Therefore, a floating height smaller than the distance defined by the bumps of the texture is inconceivable and, hence, there is a limit to realization of a lower floating height.

As a method to prevent a head slider from adhering to a smooth-surfaced disk, a mechanism for holding and floating the head slider on a Non-Contact Start Stop (NCSS) system is being considered. The mechanism of this type is such that it allows the head slider to be displaced to a retreat position at a different location from the disk surface while the disk rotation is stopped. When the head slider is caused to operate afloat over the disk, the mechanism works such that the disk is rotated at a predetermined number of revolutions for some time and then the head slider is shifted from the retreat position to over the disk surface to be set afloat.

An example of the described mechanisms is that of a ramp loading type. The mechanism of this type is such that it allows the head slider to be retreated to a retreat position provided by a slope (ramp) at a predetermined location adjacent to the outer edge surface of the disk while the disk rotation is stopped, whereby the head slider is kept out of contact with the disk surface.

In such disk drives, a head slider of a structure making use of both positive pressure and negative pressure is generally used. The head slider of this type is configured to obtain a constant amount of floatage by virtue of equilibrium of three forces as mentioned below. The first of the forces is that of a load due to a suspension acting so as to press the head slider against the disk surface. The second is a positive pressure due to an air flow produced by the disk rotation acting so as to float the head slider. The third is a negative pressure generated by the same air flow but at a recess made in the head slider acting so as to pull the head slider back to the side of the disk.

However, there has been problems as mentioned below in the use of head sliders according to the NCSS system, in which the head slider is pulled up from the disk surface and displaced to a retreat position as, for example, in the ramp loading method. Namely, at the time of unloading, even when the load from the suspension is eliminated, the negative pressure does not immediately decrease because of the existence of the air flow due to the rotation of the disk. Therefore, an extra lifting load to overcome the negative pressure is needed. Further, a greater lifting stroke is needed. This has made it difficult to make the head slider smaller and thinner and to allow it a faster unloading operation. Further, at the time of loading when the head slider is shifted from the retreat position to over the surface of the disk so as to be steadily set afloat, the attitude of the head slider tends to become unstable when it is pulled down toward the disk surface, and sometimes the head slider collides with the surface of the disk to damage it.

To overcome the described problems, a head slider structured so as to quickly decrease the negative pressure at the time of unloading is disclosed in U.S. Pat. No. 6,288,874. FIG. 12A is a plan view of the head slider seen from the face opposing the disk. FIG. 12B is a sectional side view showing the relationship between head slider 3 and disk 2 in the state of head slider 3 being afloat over the outer edge portion of disk 2 before being unloaded. Incidentally, though head slider 3 floats over disk 2 by being supported by a suspension, the suspension is not illustrated in the drawing for simplicity of description. FIG. 12A and FIG. 12B also show positive pressure Fp, negative pressure Fn, and load Fs from the suspension (not shown) as well as their respective points of application of the pressures.

The suspension (not shown) holds head slider 3 through a gimbal (not shown) and applies load Fs to head slider 3 by means of a pivot (not shown) located at point of application Ps. Negative pressure generating section 74 is of a structure surrounded by protruded rail portions on both sides 72, hence having a deep step, or a sharp drop in level, and having an opening at its outlet end. Air inflow from both sides is prevented by rail portions on both sides 72 and thereby the efficiency of generation of negative pressure is enhanced. At the distal ends on the outlet side of rail portions on both sides 72, there are provided closer-to-disk faces 71 which are slightly higher than rail portions on both sides 72, hence closer to disk 2. Head 80 is disposed on one of closer-to-disk faces 71.

Positive pressure generating section 73 is made up of shallow-stepped portion 731 at the same level as rail portions on both sides 72 and inlet-side closer-to-disk face 732 at the same level as closer-to-disk face 71. Between positive pressure generating section 73 and negative pressure generating section 74, there is provided setting region 76 at the same level as rail portions on both sides 72. By adjusting the width (SW) of setting region 76, the point of application of negative pressure Pn is set on the outlet side, i.e., on the down stream side, of the point of application of suspension load Ps.

The transition from the condition of the head slider 3 steadily floating over disk 2 in rotation to the condition of its being unloaded takes place in this way. Namely, when load Fs from the suspension is decreased for the unloading, positive pressure Fp and negative pressure Fn cannot immediately decrease following the decrease of load Fs. Consequently, an angular moment is generated by the two forces and applied to head slider 3. The angular moment acts so as to quickly increase the pitch angle of head slider 3, i.e., the angle formed between head slider 3 and the surface of disk 2. Hence, the gap between inlet-side closer-to-disk face 732 and disk 2 is rapidly increased. As a result, the amount of air flow taken from the inlet side into the space between head slider 3 and disk 2 is increased to quickly decrease negative pressure Fn. Accordingly, adhesion of head slider 3 to disk 2 due to the production of negative pressure at the time of unloading can be suppressed and a stabilized unloading operation can be performed with the ramp at the retreat position kept at a minimum required height.

However, in the described mechanism to increase the pitch angle by making use of the angular moment to thereby decrease the negative pressure, there is a possibility of occurrence of an excessive angular moment, which is applied to head slider 3 to cause head slider 3 to come into contact with disk 2. When, for example, an external shock is applied to the disk drive, while load Fs from the suspension is being decreased for unloading, so that head slider 3 is caused to approach disk 2, then positive pressure Fp increases immediately but negative pressure Fn changes slower than the change of positive pressure Fp. That is, such a state is brought about in which, while load Fs from the suspension is decreased, positive pressure Fp increases and, nevertheless, negative pressure Fn does not change much. In this state, the angular moment applied to head slider 3 becomes greater than usual. Hence, the end of the air outlet side of head slider 3 comes into contact with disk 2 so that head slider 3 or disk 2 sometimes suffers damage.

When power supply to a disk drive is cut off for some reason or other while the apparatus is in operation, it is required that the unloading operation be completed before the rotation of disk 2 is stopped. Also when an unloading operation is performed in such an unstable state with the rotational speed of disk 2 decreased, then, though the positive pressure decreases with the decrease in the air flow velocity, the negative pressure does not decrease keeping pace with the decrease in the positive pressure. Hence, equilibrium of the forces is lost and an angular moment is produced to be applied to head slider 3, so that there arises a possibility of the end of the air outlet side coming into contact with disk 2. When, as in the conventional art example, point of application Pn of negative pressure Fn is set on the downstream side of the point of application Ps of load Fs from the suspension, the pitch-angle rigidity, i.e., degree of stability against change in pitch angle, decreases. Therefore, head slider 3 easily vibrates when subjected to external disturbance such as an impact and, further, the possibility of its coming into contact with disk 2 at the time of unloading increases.

Further, in the loading operation to move the head slider from the retreat position to over the disk surface, it is necessary to allow the head slider, which is supported by a suspension generally made of an elastic member, to be set afloat over the disk surface without being damaged. In the head slider of the ramp loading type as described above, the loading is performed from the ramp portion, and hence a relatively stable floating operation can be realized. However, in the case of such a type on the NCSS system in which the head slider is brought to over the disk surface and, then, set afloat while it is pushed downward, the effect of vibration of the suspension cannot be sufficiently eliminated and a stabilized floating motion is difficult to attain. For example, the pitch angle of the head slider when it is steadily afloat over a disk is generally 0.1 mrad or so. On the other hand, when the suspension vibrates while the head slider is pushed down, the head slider can be loaded over the disk surface at a pitch angle greater than 1 mrad. When such a great pitch angle is produced, the end face of the head slider can come into contact with the disk to cause damage, before a gap to provide a sufficient positive pressure is secured between the positive pressure generating section and the disk.

SUMMARY OF THE INVENTION

The present invention has been made to overcome the above enumerated problems. It is an object of the invention to provide a head slider for use in the NCSS system in which the head slider is retreated from the disk surface when a disk drive is stopped. More particularly, it is an object to provide a head slider capable of eliminating occurrence of contact between the head slider and a disk at the time of unloading and securing a stable pitch-angle rigidity even when subjected to external disturbance such as an impact, thereby enabling high speed loading/unloading operations to be made, and to provide a disk drive using the same.

A head slider of the present invention comprises: a front surface opposing a disk-formed recording medium; an air inlet end section; an air outlet end section; a disk inner edge side; and a disk outer edge side. The front surface includes: a positive pressure generating section; a negative pressure generating recess; a head provided at the side of the air outlet end section for performing at least one of recording operation and playing back operation on the disk-formed recording medium; and a sloped face extending from the air outlet side (i.e., downstream side) of the negative pressure generating recess to at least one of the ends at the air outlet end section, the disk inner edge side, and the disk outer edge side and arranged such that its distance from the disk-formed recording medium, while the head slider is steadily afloat over the recording medium, becomes gradually larger toward its end.

By virtue of the described configuration, the negative pressure can be decreased quickly at the time of high-speed unloading. Therefore, damage of the suspension is prevented and the lifting stroke can be reduced so that a thinner type of disk drive can be realized. The floating height of the head slider in the NCSS system can be made smaller and the floating can be made more stable and, hence, a disk drive capable of making still higher density recording can be realized.

DETAILED DESCRIPTION OF THE EXEMPLARY EMBODIMENTS

Exemplary embodiments of the present invention will be described below with reference to the accompanying drawings. In the following description, as well as the claims, the term "downstream" refers to the direction of air flow along the head slider.

First Embodiment

Figure 1A:
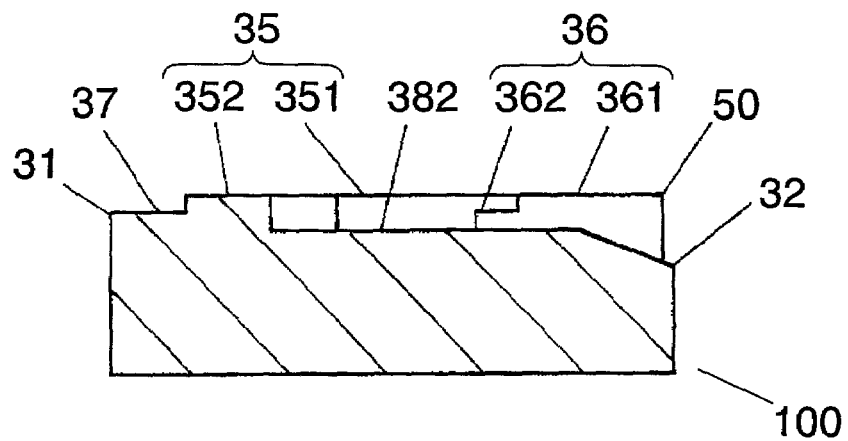
FIG. 1A is a cross-sectional view of a head slider according to a first embodiment of the invention.
Figure 1B:
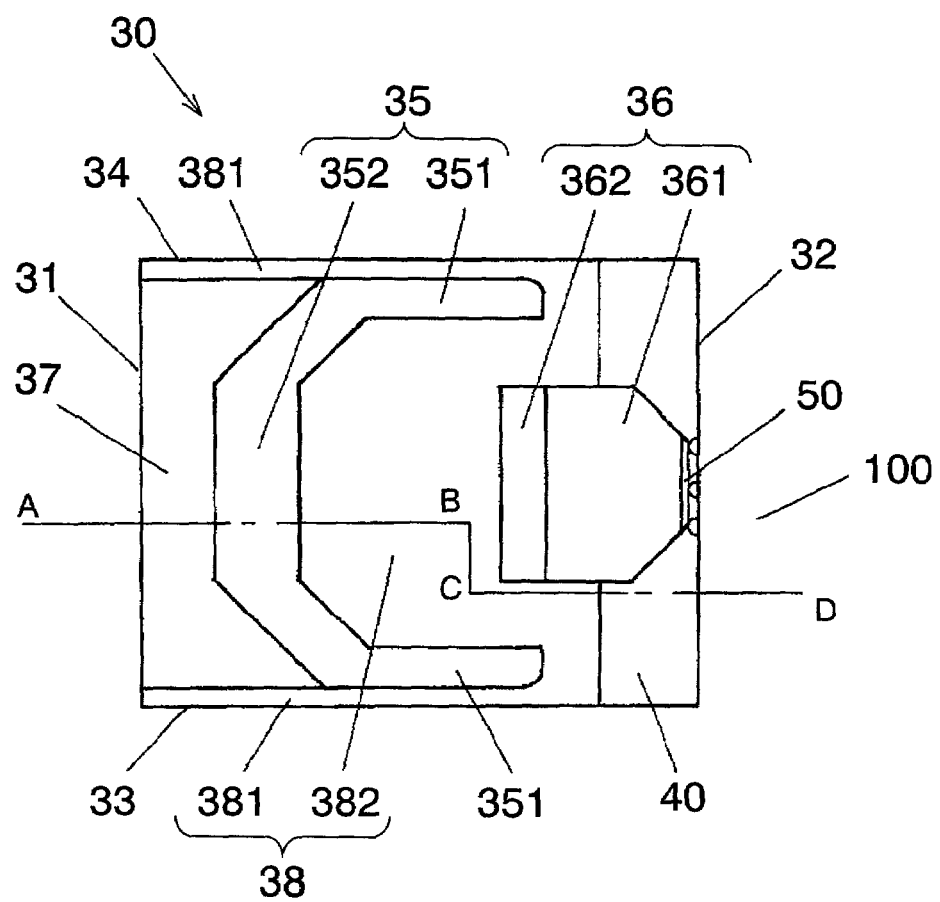
FIG. 1B is a plan view of the head slider seen from the side of its face opposing a disk.
Figure 2:
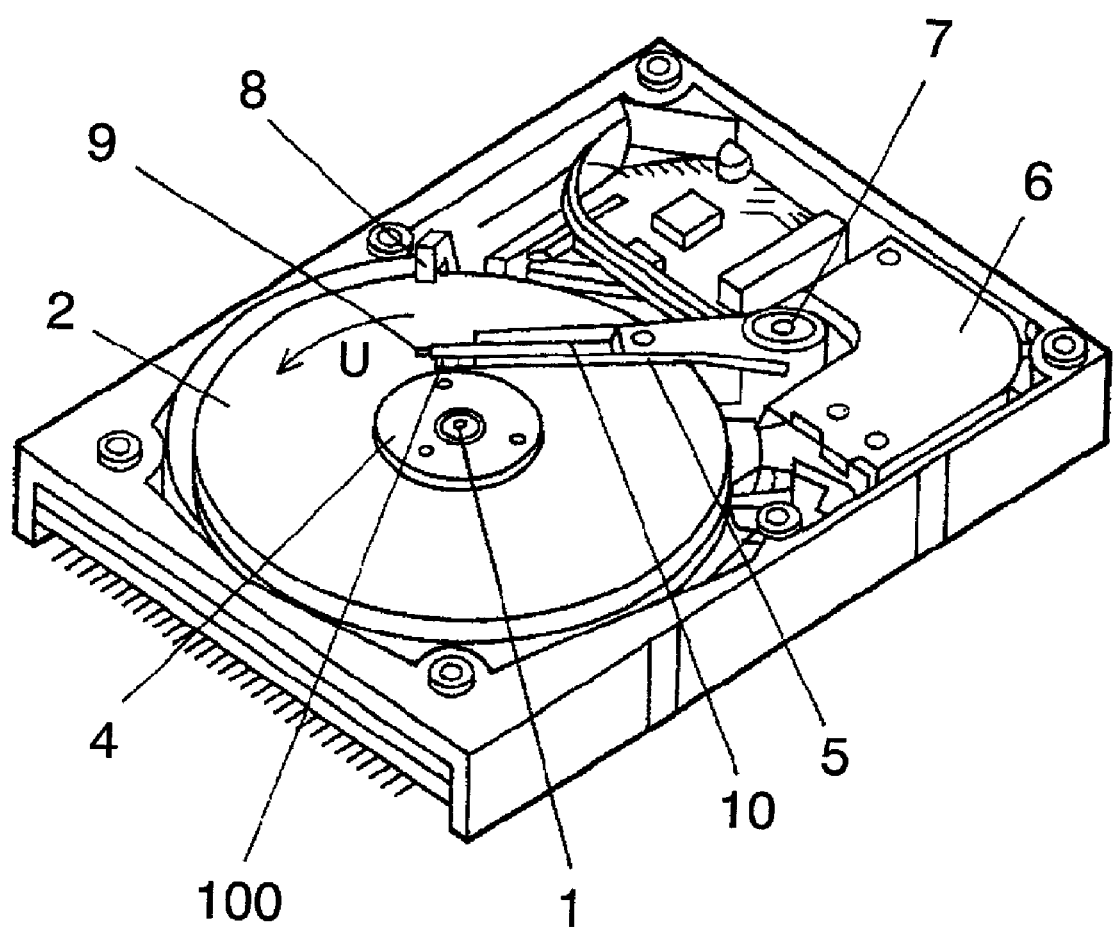
FIG. 2 is a perspective view of a disk drive of a ramp loading type using a head slider of the present invention.

FIG. 1A shows a sectional view of a head slider of a first embodiment of the present invention, and FIG. 1B shows a plan view of the head slider seen from the side of (i.e., looking towards) its face opposing a disk. FIG. 2 shows a disk drive on the NCSS system using head slider 100. The drawing shows the apparatus with the housing cover removed.

Disk 2 is fixed on main spindle 1 and rotationally driven by driver 4. As this driver 4, a spindle motor for example is used. Head slider 100 and tab for loading 9 are supported on suspension 10. This suspension 10 is fixed to actuator arm 5 and actuator arm 5 is rotatably attached to actuator shaft 7. Voice coil motor 6 swings actuator arm 5 to thereby shift head slider 100 with a head (not shown) attached thereto to a predetermined track position. In a predetermined position adjacent to the outer edge of disk 2, there is provided retreat position 8 formed of a ramp.

In the disk drive, disk 2 rotates in the direction indicated by arrow U in association with main shaft 1 integrally rotating with driver 4. While head slider 100 is afloat over disk 2 which is in rotational motion, the head (not shown) mounted on head slider 100 performs recording or playing back in a predetermined track position of disk 2. The positioning of the head on a predetermined track position is achieved by actuator arm 5 swung by rotation of voice coil motor 6.

Loading/unloading operations in the disk drive on this system will be described. Unloading operation is performed as follows. When actuator arm 5 is swung upon rotation of voice coil motor 6, actuator arm 5 allows head slider 100 floating over disk 2 to move in the direction of retreat position 8 provided in a predetermined position in the vicinity of the outer edge of disk 2. With the retreat of head slider 100, tab for loading 9 attached to suspension 10 lands on retreat position 8, whereby head slider 100 is retreated from disk 2 and held on retreat position 8. At the time of loading, voice coil motor 6, after disk 2 is rotated by driver 4, is driven such that actuator arm 5 is swung toward the inner edge side of disk 2, whereby head slider 100 is separated from retreat position 8 and set afloat over disk 2. While head slider 100 is afloat over disk 2, the head (not shown) mounted on head slider 100 records data onto or plays back data from predetermined track positions of the disk.

As shown in FIG. 1A and FIG. 1B, head slider 100 comprises: front surface 30 opposing a disk, air inlet end 31 serving as the air inlet side in the direction of disk rotation, air outlet end 32 on the opposite side, disk inner edge side 33 on the side of the disk inner edge, and disk outer edge side 34 on the opposite side. Front surface 30 comprises: positive pressure generating section 35, flotation improving section 36, positive pressure improving intermediate-level face 37 surrounded by positive pressure generating section (high-level face) 35 and air inlet end 31, lower-level face 38, and sloped face 40 extending from the air outlet (i.e., downstream) side of lower-leveled face 38. When positive pressure generating section (high-level face) 35 is taken as a reference level, (lower-level) face 38 has a large difference in level and positive pressure improving intermediate-level face 37 has a smaller difference in level than lower-level face 38.

Positive pressure generating section (high-level face) 35 is constituted of two side rails 351 and cross rail 352 connected to these side rails; and rails 351 and 352 as a whole are U-shaped and lying on the same plane. Side rails 351 are arranged in (i.e.,. extend in) the direction from air inlet end 31 to air outlet end 32, and are spaced a predetermined distance apart from disk inner edge side 33 and disk outer edge side 34. Cross rail 352 is formed of an orthogonal portion located a predetermined distance from air inlet end 31, and arranged orthogonally with respect to the direction of the air inflow and oblique portions having both ends thereof connected to each of side rails 351.

Flotation improving section 36 is disposed in the central portion with respect to the lateral direction, i.e., the direction from disk inner edge side 33 to disk outer edge side 34, so as to form a hexagon as shown in FIG. 1B. Flotation improving section 36 is made up of positive pressure improving face 361 at the same level as positive pressure generating section 35 and intermediate-level face on outlet side 362 at the same level as positive pressure improving intermediate-leveled face 37. Incidentally, positive pressure improving face 361 on the side of air outlet end 32 of flotation improving section (face) 36 has head 50 mounted thereon for recording or playing back data onto or from the disk.

Lower-level face 38 is formed of side lower-level faces 381 and negative pressure generating recess 382, which are on the same level. Side lower-leveled faces 381 are provided at the positions of disk inner edge side 33 and disk outer edge side 34, in striped form extended from air inlet end section 31 to air outlet end section 32. Negative pressure generating recess 382 is a region surrounded by positive pressure generating section 35, flotation improving face 36, and sloped face 40.

Sloped face 40 extends from the end on the air outlet side of negative pressure generating recess 382 to air outlet end section 32, and it is arranged such that its distance from the disk, while the head slider is steadily afloat over the disk, becomes gradually larger toward its end.

Although such a head slider can be processed by die forming or by general machining, more preferable processing is the application of semiconductor processing technology such as photolithography and etching. As the etching work, not only wet or dry etching can be made, but also working by laser beam irradiation or ion irradiation may be used in suitable combination.

In the case of the above-described head slider, the method of processing by means of ion irradiation is used to set the difference in level between positive pressure generating section (high-level face) 35 and positive pressure improving intermediate-level face 37 to 0.08 µm, and the difference in level between positive pressure improving intermediate-level face 37 and lower-level face 38 to 1.2 µm. The angle between sloped face 40 and lower-level face 38 is set to 0.6 mrad, and the length of sloped face 40 (the distance from the end on the air outlet side of lower-level face 38 to air outlet end section 32) is set to 0.15 mm. As to the overall size of head slider 100, the dimension in the longitudinal direction from the air inlet end to the air outlet end, the dimension in the lateral direction from the disk inner edge side to the disk outer edge side, and the thickness are set to 1 mm, 0.7 mm, and 0.23 mm, respectively.

Figure 3A:
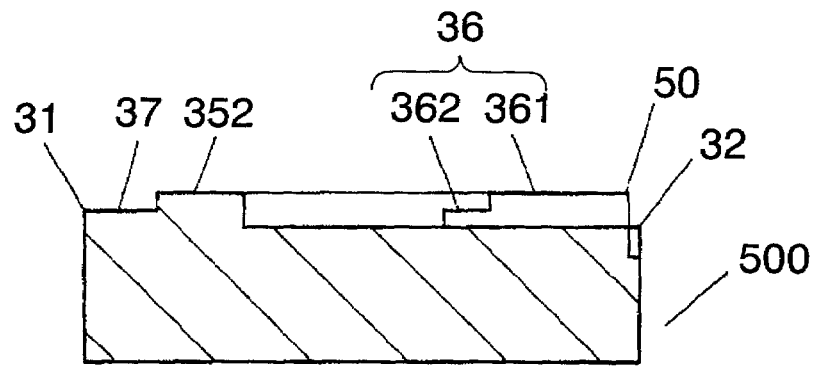
FIG. 3A is a cross-sectional view of a head slider produced for comparison.
Figure 3B:
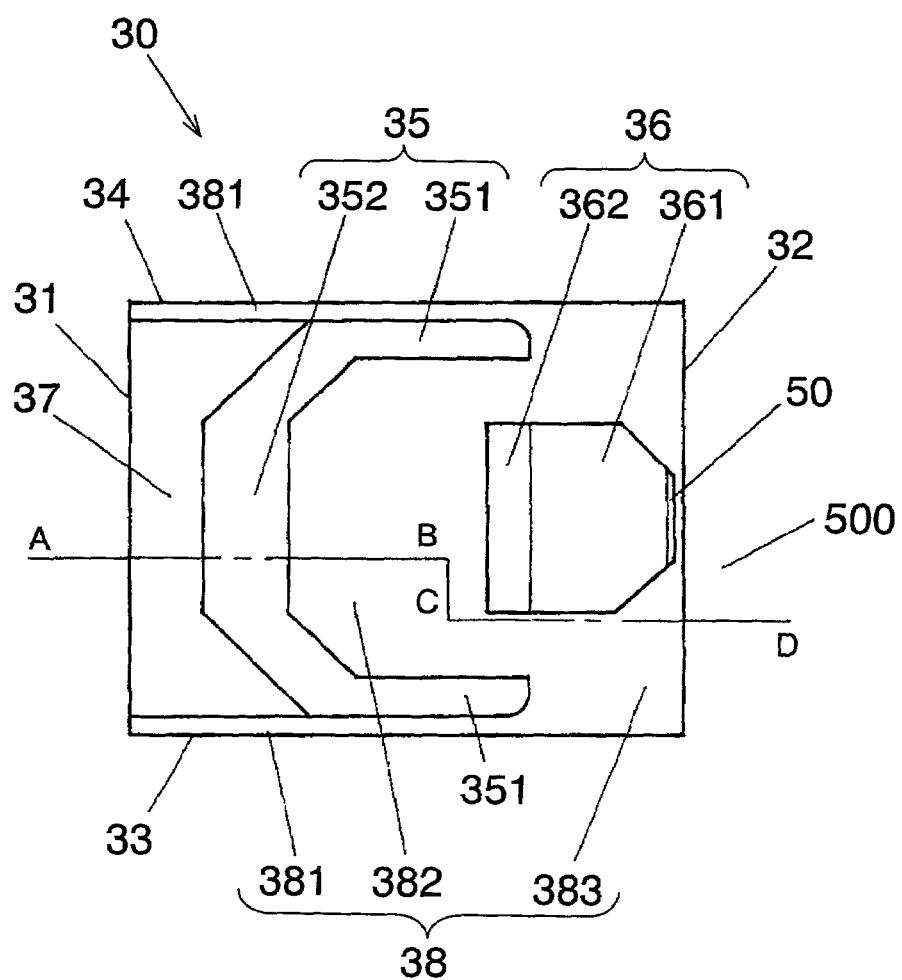
FIG. 3B is a plan view of the head slider seen from the side of its face opposing a disk.

To compare head slider 100 as to effects in its actually-used state with a comparison example, head slider 500 provided with no sloped face was produced. This head slider is shown in FIG. 3A and FIG. 3B. Although overall size of this head slider is the same as that of head slider 100, its sloped face is eliminated by extending lower-leveled face 38 to air outlet end 32. More specifically, the sloped face is eliminated by arranging the head slider 100 such that lower-level face 38 is formed of side lower-level faces 381, negative pressure generating recess 382, and lower-level face on outlet side 383, all lying on the same plane. In FIG. 3A and FIG. 3B, components corresponding to those shown in FIG. 1A and FIG. 1B are denoted by corresponding reference numerals. Through comparison of head slider 100 with head slider 500, characteristics of the present invention will be described.

Figure 4A:
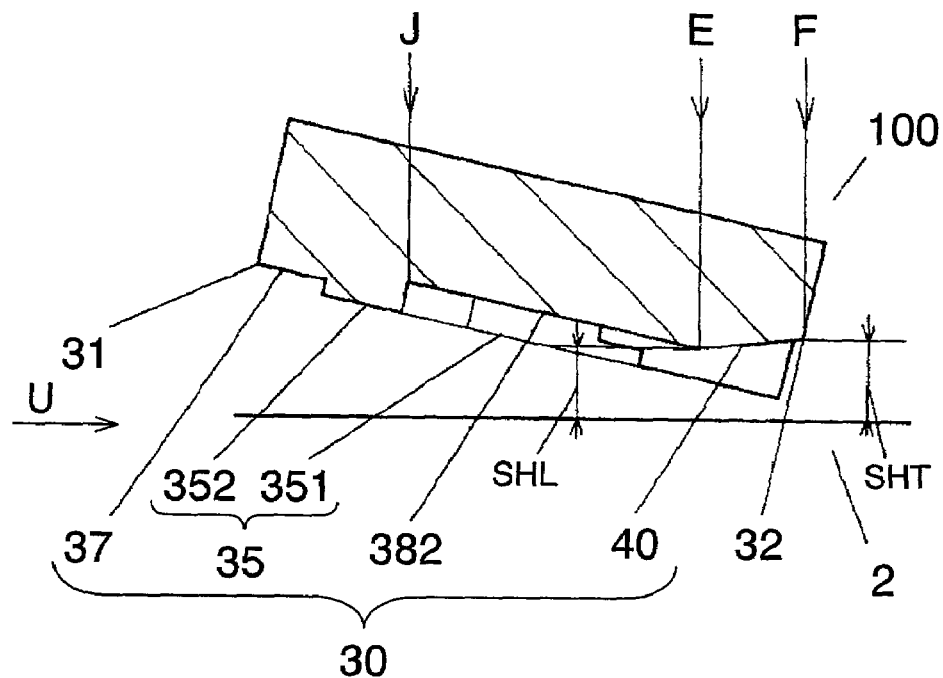
FIG. 4A is a cross-sectional view of the head slider of the first embodiment of the invention while the same is steadily afloat over a disk.
Figure 4B:
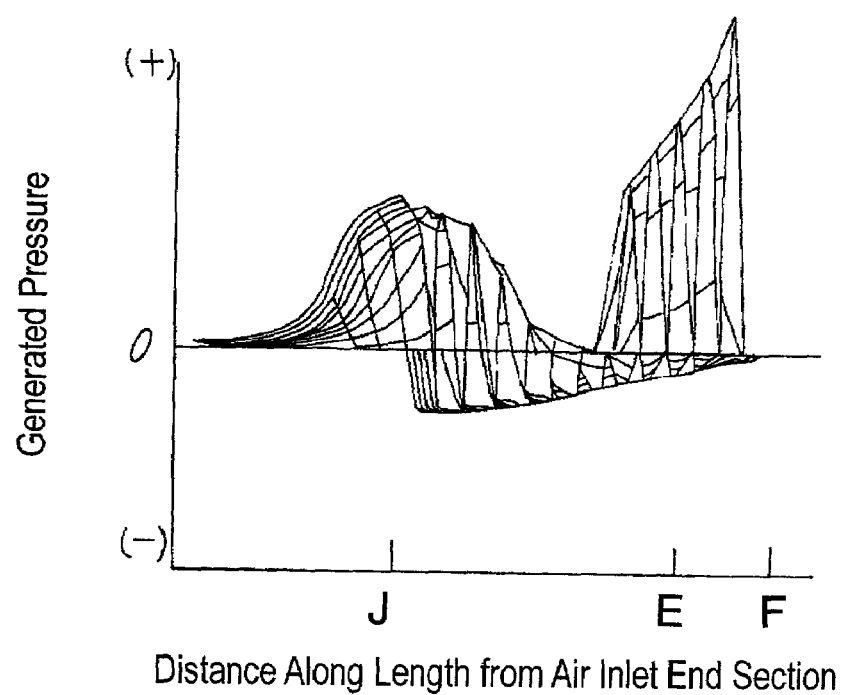
FIG. 4B is a pressure distribution drawing of the head slider while the same is steadily afloat over a disk.
Figure 5A:
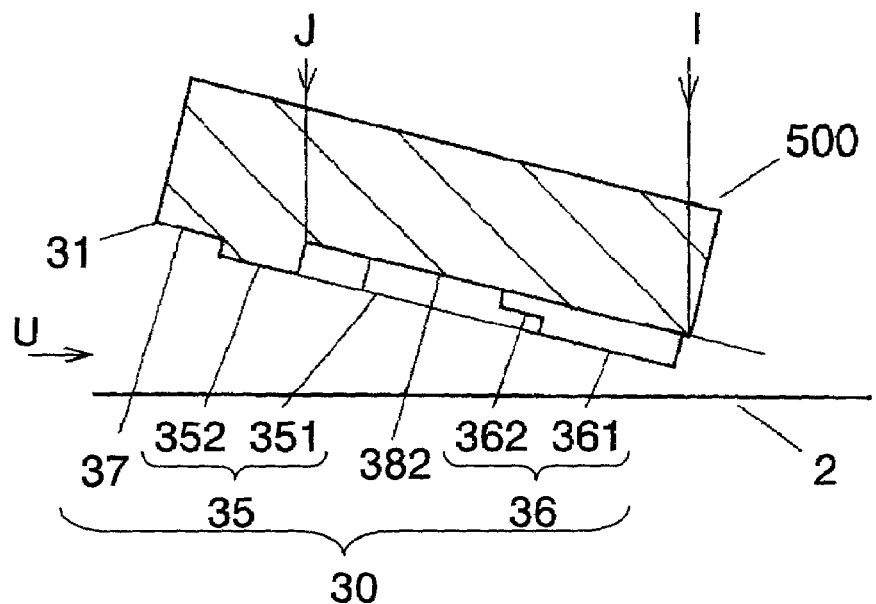
FIG. 5A is a cross-sectional view of the head slider for comparison while the same is steadily afloat over a disk.

FIG. 4A and FIG. 4B are sectional views of the respective head sliders while being steadily afloat over rotating disk 2. In particular, FIG. 4A shows the case of head slider 100 of the first embodiment, and FIG. 5A shows the case of head slider 500 for comparison. Incidentally, though the head slider floats over the disk by being supported by suspension 10 as shown in FIG. 2, the floating attitude of the head slider alone is illustrated in FIG. 4A and FIG. 5A for simplicity of description. Hereinafter, similar comments apply to drawings showing such floating attitude. Head slider 100 and head slider 500 are each supported by a suspension (not shown) through a gimbal (not shown) so as to be given a load in the direction to be pressed against disk 2 through a pivot (not shown) at the front end of the suspension. Since the supporting structure itself is the same as was shown in FIG. 2, it is omitted in the present drawings.

The air flow occurring due to the rotation of disk 2 is such that air flows in the direction indicated by arrow U. Referring to FIG. 4A, when the air flow is led into positive pressure generating section 35, it is compressed at this section, especially at the space between cross rail 352 and disk 2, whereby a positive pressure to lift up head slider 100 is generated. After passing by cross rail 352, the air flow is abruptly expanded at negative pressure generating recess 382 having a sharp drop in level and hence a negative pressure to attract head slider 100 toward disk 2 is generated. By an equilibrium of forces of the load from the suspension, positive pressure, and negative pressure, head slider 100 achieves flotation in an attitude with the side of air inlet end section 31 slightly opened upward from the surface of disk 2.

Incidentally, points of application of the loads and the angle of sloped face 40, at the time when head slider 100 is making steady floatation as shown in FIG. 4A, are designed so that SHL<SHT is satisfied, where SHL and SHT are the distances of the positions of end E on the air inlet side and end F on the air outlet side of sloped face 40, respectively, from disk 2. The condition can be easily obtained by using such parameters as the radius of disk 2, its rotational speed, the skew angle, and the target floating height.

Since the state of steady flotation of head slider 500 of the comparison example shown in FIG. 5A is the same as that described with reference to FIG. 4A, the description of it will be omitted.

Figure 5B:
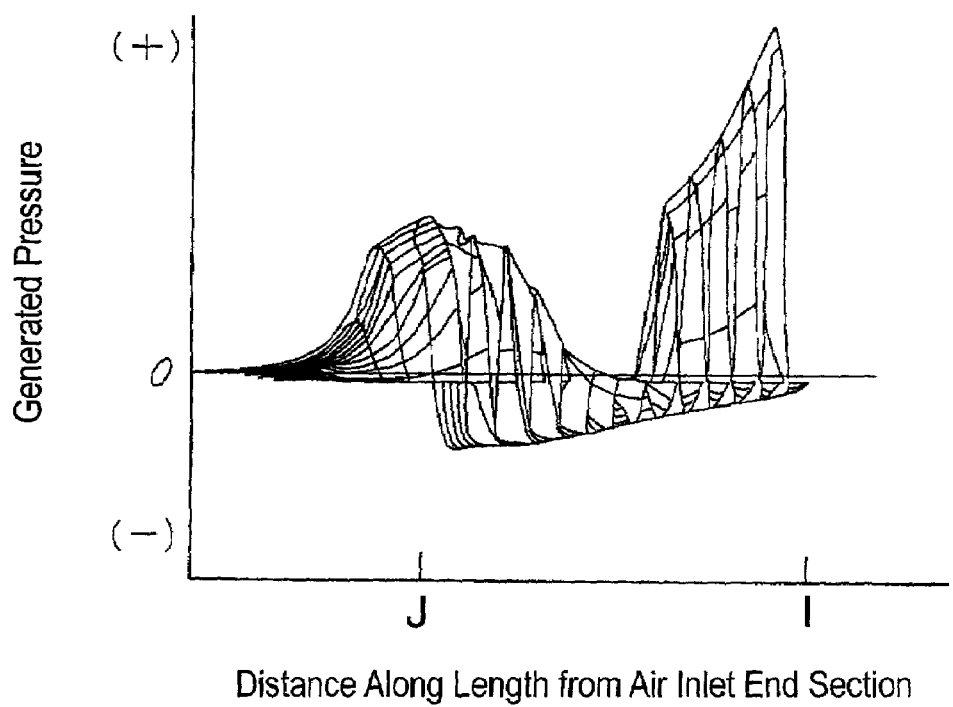
FIG. 5B is a pressure distribution drawing of the head slider while the same is steadily afloat over a disk.

Results of analysis of pressure distribution in head slider 100 of the first embodiment and head slider 500 of the comparison example while steadily floating are shown in FIG. 4B and FIG. 5B. The pressure distribution shown in each drawing is that obtained as a result of measurement made at four positions in the lateral direction of the head slider and along the longitudinal direction from air inlet end section 31 to air outlet end section 32. The pressure distribution is measured at the same positions both in the lateral and longitudinal directions for head slider 100 and head slider 500. Incidentally, reference characters J, E, F, and I in the drawings are given for ease of understanding the connection between generated pressures and the relative positions in the head slider.

While steady floating is achieved, no great difference is observed between head slider 100 and head slider 500 except that the negative pressure at the portion of sloped face 40 (between E and F) of head slider 100 is slightly smaller than that at the corresponding portion of head slider 500 of the comparison example shown in FIG. 5B. From this, it is known that the effect of the sloped face while achieving steady floating is small, and stabilized floatation is achieved in either case.

Further, stability of the head sliders while achieving steady floating is compared with respect to the pitch angle and the roll angle. Pitch angle rigidity, which denotes the rate of the pitch angle varying with an external disturbance, allows evaluation of stability of the pitch angle. Meanwhile, the angle formed between the lateral orientation of the head slider and the disk surface is called the roll angle and the rate of the roll angle varying with an external force is defined as the roll angle rigidity. Results of comparison about such rigidity are shown in Table 1. As understood from Table 1, no great differences are observed between head slider 100 provided with sloped face 40 and head slider 500 of the comparison example, and a stable floating attitude can be maintained even if sloped face 40 is provided.

TABLE 1

|  | Head Slider 100 of First Embodiment (gf/nm) | Head Slider 500 of Comparison Example (gf/nm) |
| --- | --- | --- |
| Pitch Angle Rigidity | 0.178 | 0.18 |
| Roll Angle Rigidity | 0.009 | 0.0087 |

Figure 6A:
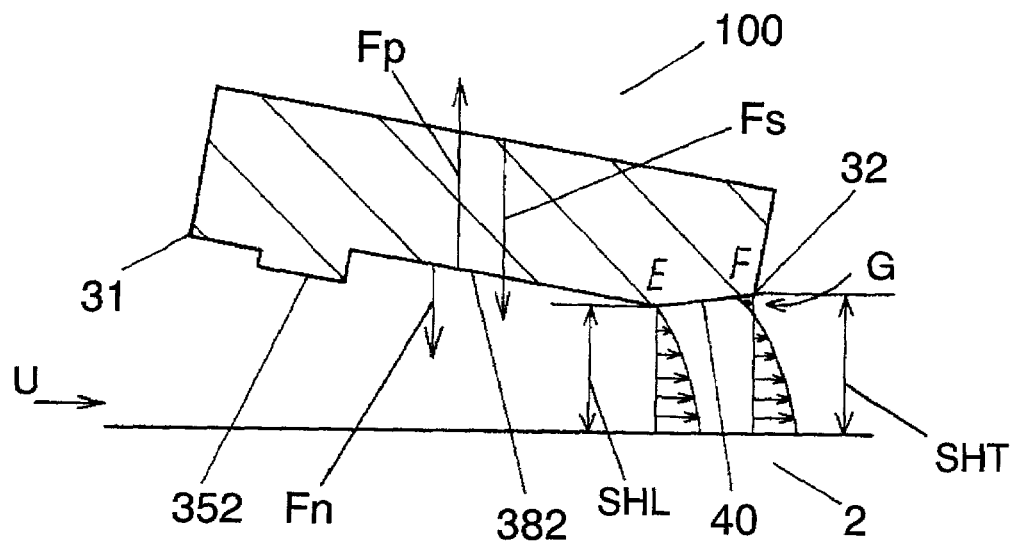
FIG. 6A is a drawing showing loads exerted on the head slider of the first embodiment of the invention while the same is pulled upward from the surface of a disk and related air flows.
Figure 6B:
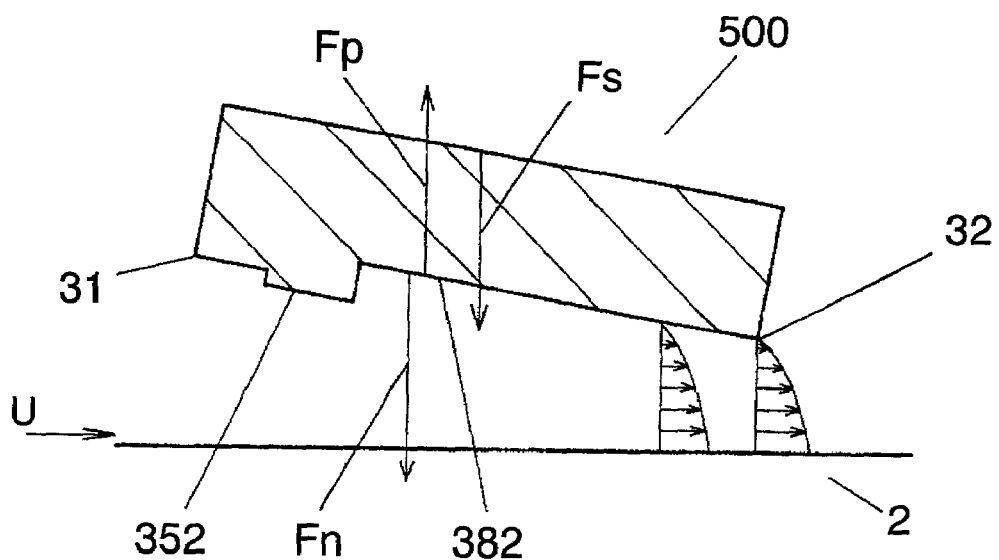
FIG. 6B is a drawing showing loads exerted on the head slider for comparison while the same is pulled upward from the surface of a disk and related air flows.
Figure 7:
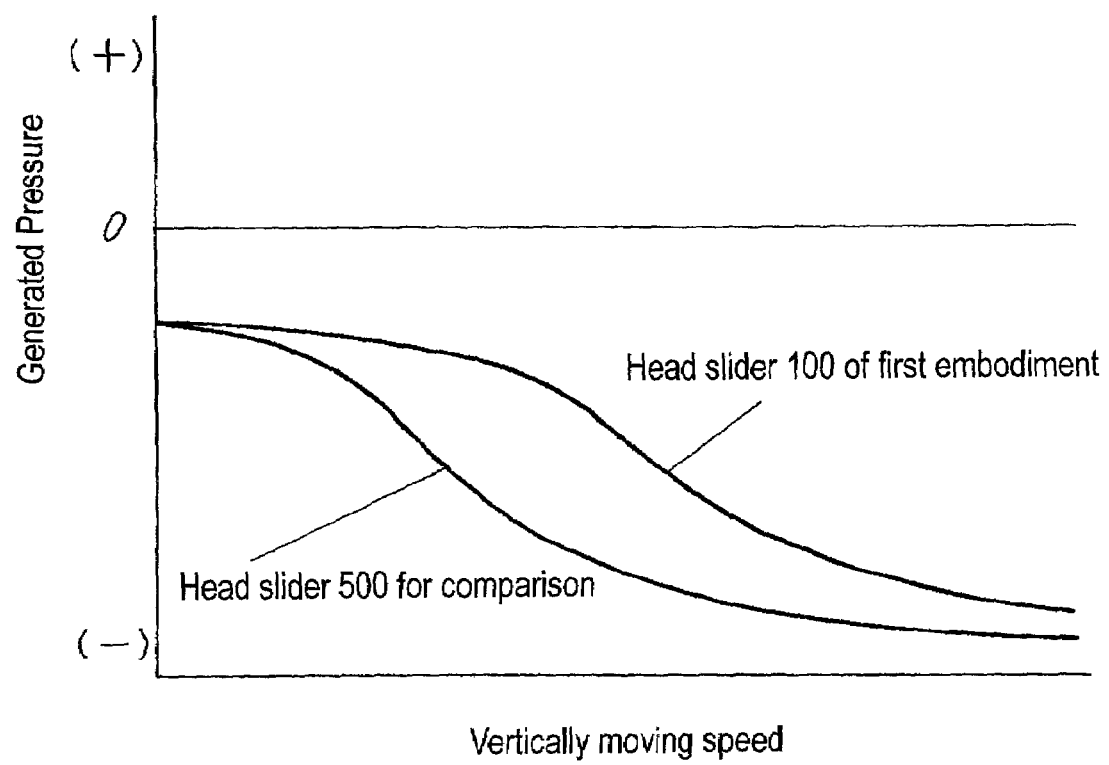
FIG. 7 is a drawing showing a relationship between the vertical moving speed when head sliders are vertically pulled upward and related negative pressures.

Referring to FIG. 6A, FIG. 6B, and FIG. 7, effects produced while unloading is made will now be described. Incidentally, FIG. 6A and FIG. 6B show only main portions of the cross-sections shown in FIG. 4A and FIG. 4B. At the time of unloading in the NCSS system, the space between the head slider and the disk is abruptly expanded when the head slider is pulled upward, and thereby an additional negative pressure is generated. The negative pressure has such a characteristic that it becomes larger as the vertically moving speed for unloading becomes greater.

In the case of head slider 100 shown in FIG. 6A, the point of application of each load and the angle of the sloped face are designed such that the distance of positions of end E on the air inlet side and end F on the air outlet side of sloped face 40, respectively, from the disk face is given by SHL<SHT. As load Fs from the suspension (not shown) is decreased for performing unloading, the distance between disk 2 and head slider 100 becomes larger. With the increase in this distance, positive pressure Fp decreases linearly. At the same time, since the distance between air outlet end side F of sloped face 40 and disk 2 is made larger than the distance between air inlet end side E of sloped face 40 and disk 2, an inflow of air indicated by arrow G is introduced from the side of air outlet end section 32 into negative pressure generating recess 382. By virtue of this inflow of air, even if the space between disk 2 and head slider 100 is suddenly expanded due to a decrease in load Fs from the suspension, the increase in negative pressure can be suppressed and the delay of decrease of negative pressure with respect to decrease of positive pressure can also be prevented.

Meanwhile, in the case of head slider 500 of the comparison example shown in FIG. 6B, when load Fs from the suspension (not shown) is decreased for performing unloading, the distance between disk 2 and head slider 500 becomes larger as load Fs is decreased. With the increase in this distance, positive pressure Fp decreases linearly. However, since there occurs an increase in the negative pressure due to sudden expansion of the space as described above, negative pressure Fn decreases are delayed due to the decrease of positive pressure Fp.

Results of measurement of negative pressure varying with changes in the vertically moving speed of the head slider at the time it is lifted up for unloading are shown in FIG. 7. From this graph, it is known that the negative pressure can be quickly decreased even if the vertically moving speed of head slider 100 is increased as compared with head slider 500 of the comparison example. Therefore, the vertically moving speed at the time of unloading can be made greater and high-speed unloading can be achieved.

As described above, head slider 100 of the first embodiment can secure a certain amount of negative pressure while it is steadily afloat over disk 2, and, at the time of unloading, negative pressure can be quickly decreased by virtue of the air inflow from sloped face 40. Hence, unloading operation can be performed quickly. Further, because of the quick decrease in the negative pressure during the unloading operation, it is not necessary to exert a large force to lift the suspension. Further the stroke for lifting the suspension can be decreased and, hence, it becomes possible to produce a thinner type of disk drive.

Figure 13:
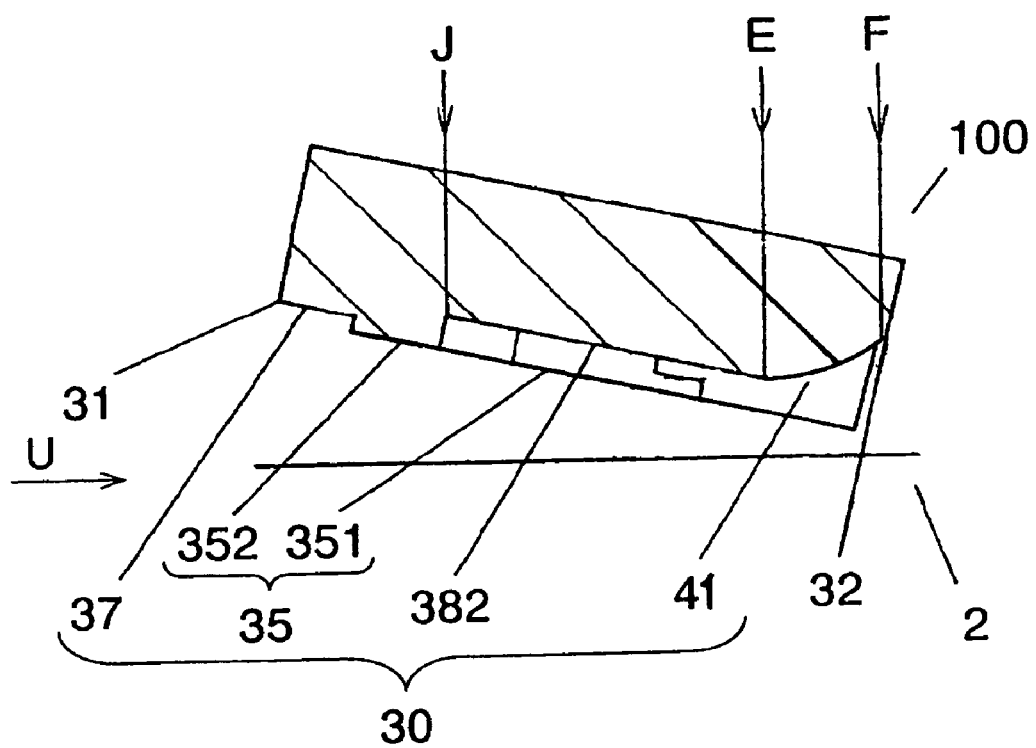
FIG. 13 is a cross-sectional view of the head slider of the first embodiment of the invention in a similar state to that shown in FIG. 4A, but illustrating a curved sloped face.

In head slider 100 of the present embodiment, sloped face 40 extends from the end on the air outlet side of negative pressure generating recess 382 to air outlet end 32, and it is arranged such that its distance from the disk, while the head slider is steadily afloat over the disk, becomes gradually larger toward its end. However, the design of the sloped face is not limited to that which was just described. It may be a sloped face 41 extended to at least one of the ends at the disk inner edge side and the disk outer edge side. Otherwise, it may be a curved sloped face extended to at least one of the ends at the air outlet end, the disk inner edge side, and the disk outer edge side, as illustrated in FIG. 13. By forming the slope face in a curved shape, stability (restoration to the original state) of the roll angle against a disturbance can be enhanced.

In head slider 100 of the first embodiment, the point of application of the negative pressure can also be set closer to the air inlet side than are the point of application of the load from the suspension and the point of application of the positive pressure. By virtue of this arrangement, the head slider 100 can be prevented from colliding with disk 2 when it is caused to approach disk 2 by an external shock at the time of unloading. More specifically, as head slider 100 approaches the disk 2, positive pressure increases. However, the angular moment due to the increase in positive pressure acts so as to increase the distance between air outlet end 32 and the surface of disk 2. As a result, air outlet end 32 located closest to the disk can be prevented from colliding with the disk.

In the first embodiment, the operation to separate head slider 100 from disk 2 is performed by swinging actuator arm 5 to allow the distal end (tab) to land on retreat position 8. However, a piezoelectric element or driving motor, for example, to drive head slider 100 in the direction vertical to the surface of disk 2 may be used. Further, the head slider is not limited to that of the ramp loading type in which unloading is performed at the edge portion of disk 2, and a type may be used in which the head slider is separated from the surface of the disk 2 at any position thereof.

In the first embodiment, head slider 100 has been described to be positively afloat over the disk surface. However, the invention is also applicable to such a case in which the head slider is barely afloat, i.e., a portion of the head slider is softly in touch with the disk surface.

Second Embodiment

Figure 8:
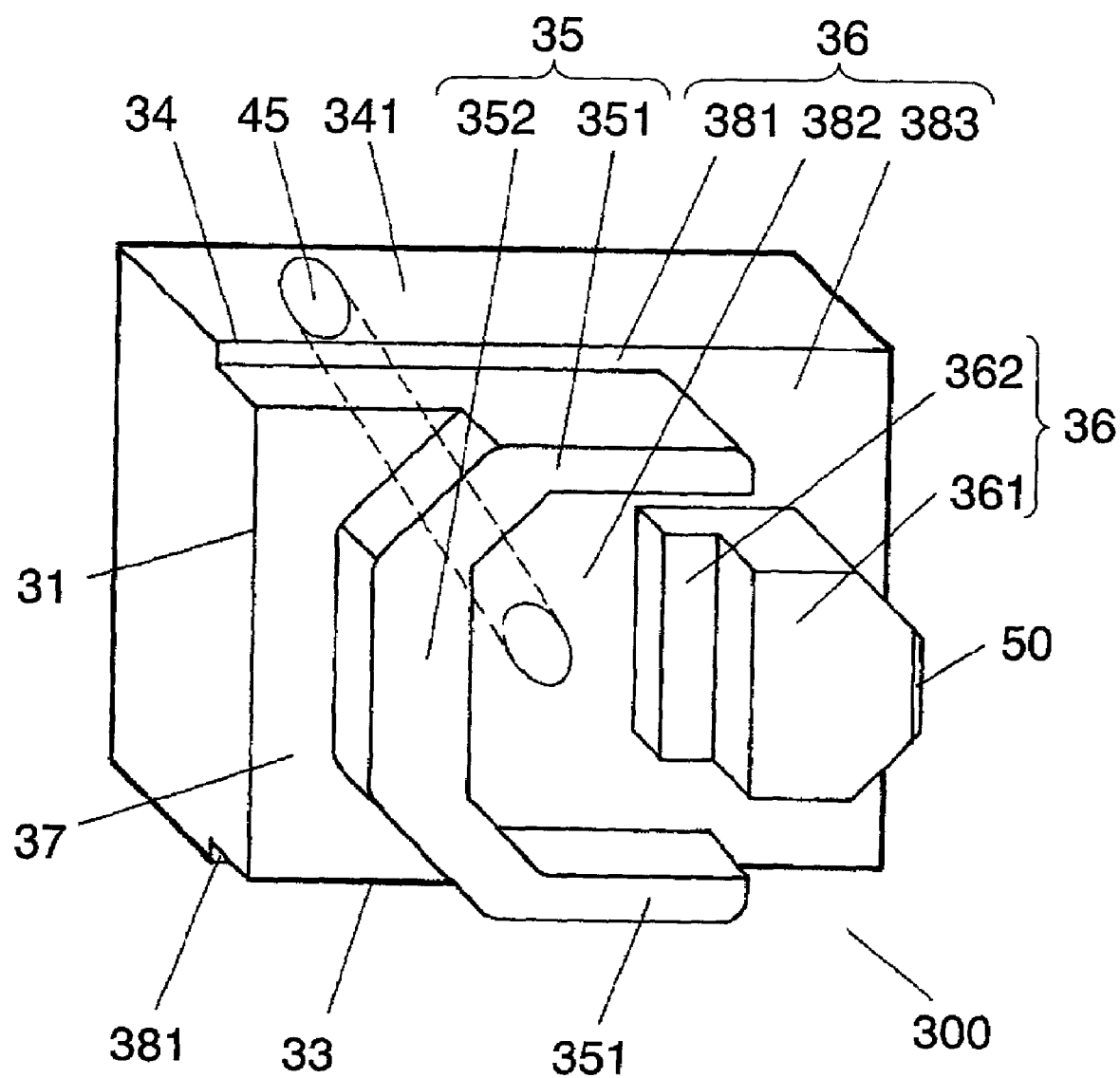
FIG. 8 is a perspective view of a head slider according to a second embodiment of the invention seen from the side of its face opposing a disk.

FIG. 8 is a perspective view of head slider 300 of a second embodiment of the present invention seen from (i.e., looking at) its face which opposes a disk. This head slider 300 has the same configuration as that of head slider 500 of the comparison example shown in FIG. 3A and FIG. 3B except that it is provided with a through hole 45 going from negative pressure generating recess 382 to end face 341 on disk outer edge 34. Corresponding components are denoted by corresponding reference numerals. Head slider 300 has a long side of 1.2 mm, a short side of 1 mm, and a thickness of 0.3 mm. Through hole 45 has a diameter of 20 μm and goes straight from end face 341 to negative pressure generating recess 382. This head slider 300 is also used for disk drives on the NCSS system using the mechanism of ramp loading type as shown in FIG. 2 or the like.

An unloading operation on the NCSS system when head slider 300 of the described type is used will be described below. When head slider 300 is moved parallel to the disk surface toward the outer edge side of the disk, air collides with end face 341 on disk outer edge side 34 and air pressure around there rises. The pressure causes an inflow of air into negative pressure generating recess 382 via through hole 45, whereby the negative pressure there is decreased. The higher the speed of the movement of head slider 300, the greater the air inflow and, hence, the greater the decrease in the negative pressure. Accordingly, it becomes possible to lift head slider 300 while it is moved parallel to the disk at a high speed and, thus, an unloading operation at any position of disk 2 can be performed.

On the other hand, the moving speed of head slider 300 when it is to be positioned at a designated track position while it is steadily afloat over disk 2 is slower than the moving speed at the time of unloading. Therefore, the inflow of air from disk outer edge side 34 to negative pressure generating recess 382 is scarcely produced and, hence, the positive pressure and negative pressure function as in head slider 500 of the comparison example so that steady floating of the head slider is secured. In addition, the load/unloading mechanisms can be made smaller and thinner so that a smaller and thinner disk drive can be realized.

Although a description has been given above as to the mechanism to perform head slider unloading at a given disk position, it is of course possible to apply the same type of head slider to a disk drive employing a ramp loading mechanism.

Although through hole 45 is provided so as to go from end face 341 on disk outer edge side 34 to negative pressure generating recess 382 in the present embodiment, it may be provided so as to go from end face 341 on disk inner edge side 33 to negative pressure generating recess 382. Further, through holes may be provided so as to go from both end faces 341, 341 to negative pressure generating recess 382.

Although lubricant or foreign matter can collect within negative pressure generating recess 382 due to the presence of negative pressure there, such lubricant or foreign matter may be eliminated by causing air to be positively led from through hole 45 into negative pressure generating recess 382 by swinging the actuator arm quickly in the radial direction of the disk.

Although a configuration of head slider having no sloped face provided on the side of the air outlet end section is employed in the present embodiment, the invention is not limited to that configuration. Such a configuration may be used that has a first air-bearing face and a second air-bearing face as described below. Namely, the first air-bearing face may be made up of a through hole going from at least one of the end faces on the disk inner edge side and disk outer edge side to the negative pressure generating recess, the negative pressure generating recess, the positive pressure generating section, and the head. The second air-bearing face may be constituted of a sloped face extended from the end on the air outlet side of the negative pressure generating recess to at least one of the ends at the air outlet end section, the disk inner edge side, and the disk outer edge side. The sloped face is adapted such that its distance from the disk, while the head slider is steadily afloat over the disk, becomes greater toward its end. By virtue of this configuration, not only the unloading operation can be performed steadily, but also, even when the pitch angle of the head slider is greatly varied due to vibration of the suspension at the time of loading, the head slider can be kept afloat with its attitude controlled.

Third Embodiment

Figure 9A:
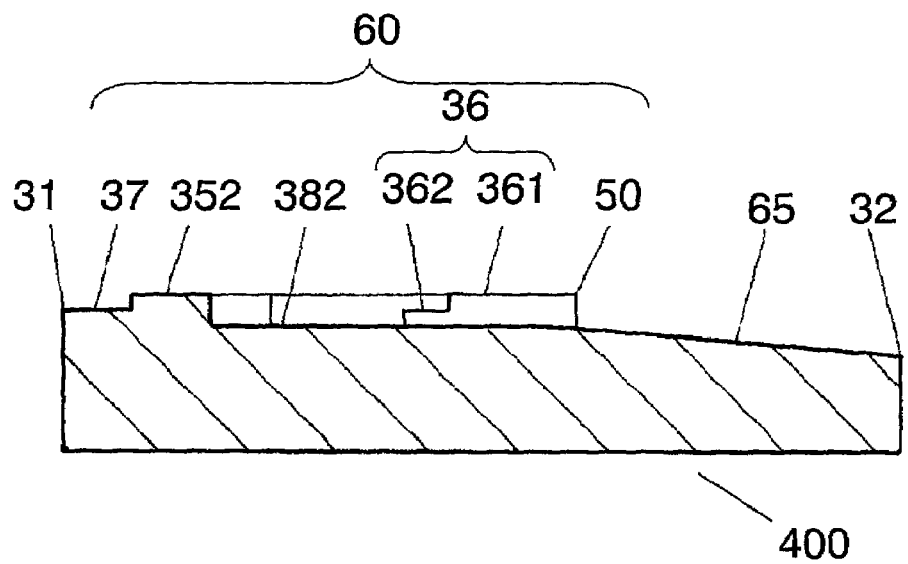
FIG. 9A is a cross-sectional view of a head slider according to a third embodiment of the invention.
Figure 9B:
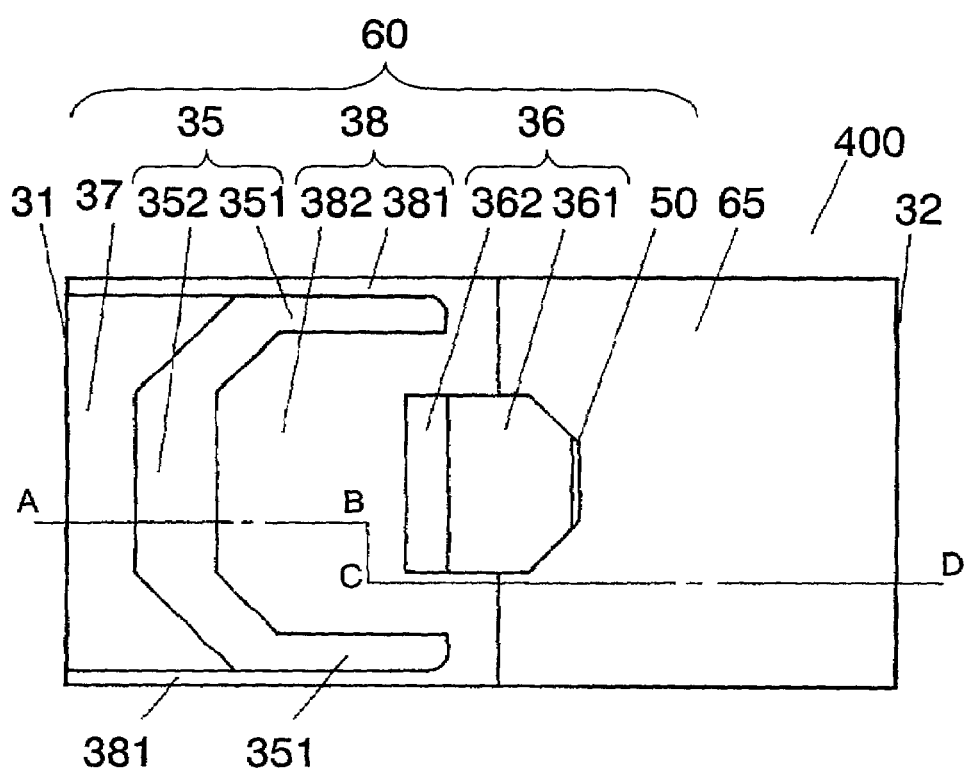
FIG. 9B is a plan view of the head slider seen from the side of its face opposing a disk.

FIG. 9A and FIG. 9B are a sectional view of head slider 400 of a third embodiment of the present invention and a plan view seen from its face opposing a disk, respectively. This head slider 400 is also used in a disk drive on the NCSS system. For example, it may be used in the disk drive using a ramp loading mechanism as shown in FIG. 2. Head slider 400 has its face opposite a disk formed of two air-bearing faces, i.e., a first air-bearing face 60 and a second air-bearing face 65.

First air-bearing face 60 is made up of positive pressure generating section (i.e., high-level face) 35, flotation improving face 36, positive pressure improving intermediate-level face 37, lower-level face 38, and head 50 provided on the side toward the air outlet end of positive pressure improving face 361. Second air-bearing face 65 is constituted of a sloped face extending from the end on the air outlet side of negative pressure generating recess to air outlet end 32 and having virtually the same area as first air-bearing face 60. Further, the angle formed between first air-bearing face 60 and second air-bearing face 65 is set at 0.9 mrad. In other words, head slider 400 is the same as head slider 100 of the first embodiment shown in FIG. 1A and FIG. 1B, only differing therefrom in that sloped face 40 of head slider 100 is enlarged in area and given a different angle of inclination, to provide second air-bearing face 65.

Figure 10A:
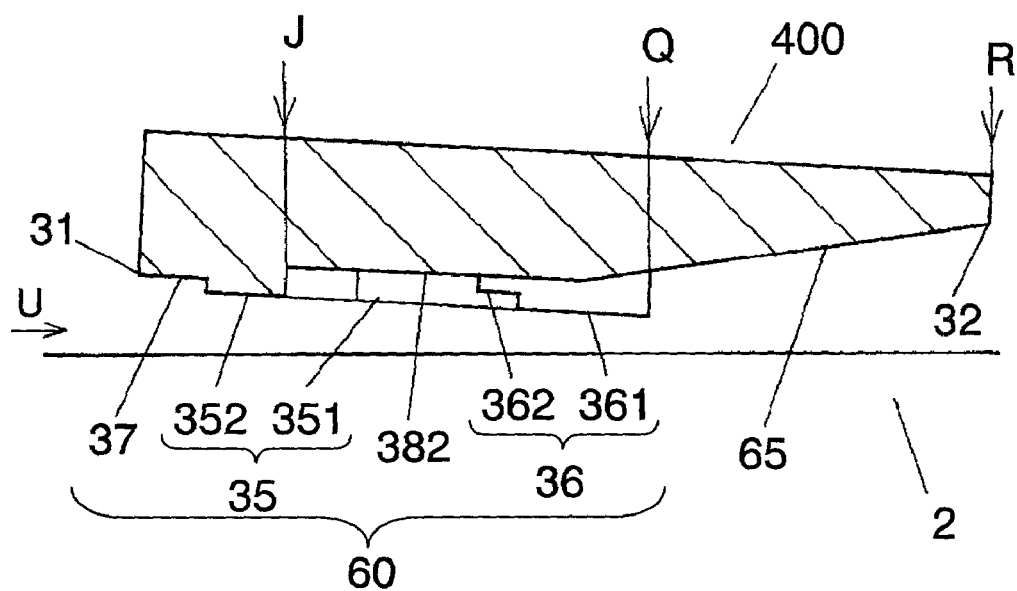
FIG. 10A is a cross-sectional view of the head slider while the same is steadily afloat over a disk.

Operation of head slider 400 will be described below. A sectional view of head slider 400 steadily afloat over disk 2 is shown in FIG. 10A. An air flow occurring with the rotation of disk 2 flows in the direction indicated by arrow U. As this air flow enters the space along first air-bearing face 60, the air flow is compressed at the section along cross rail 352 and a positive pressure is generated by the effect of viscosity. When the air flow reaches the section along negative pressure generating recess 382, a negative pressure is generated because the space there suddenly expands, as was the case in head slider 100 of the first embodiment. Meanwhile, in this state, either negative pressure or positive pressure is scarcely produced at the section along second air-bearing face 65 because it is further apart from the surface of disk 2 than is negative pressure generating recess 382 of first air-bearing face 60.

Figure 10B:
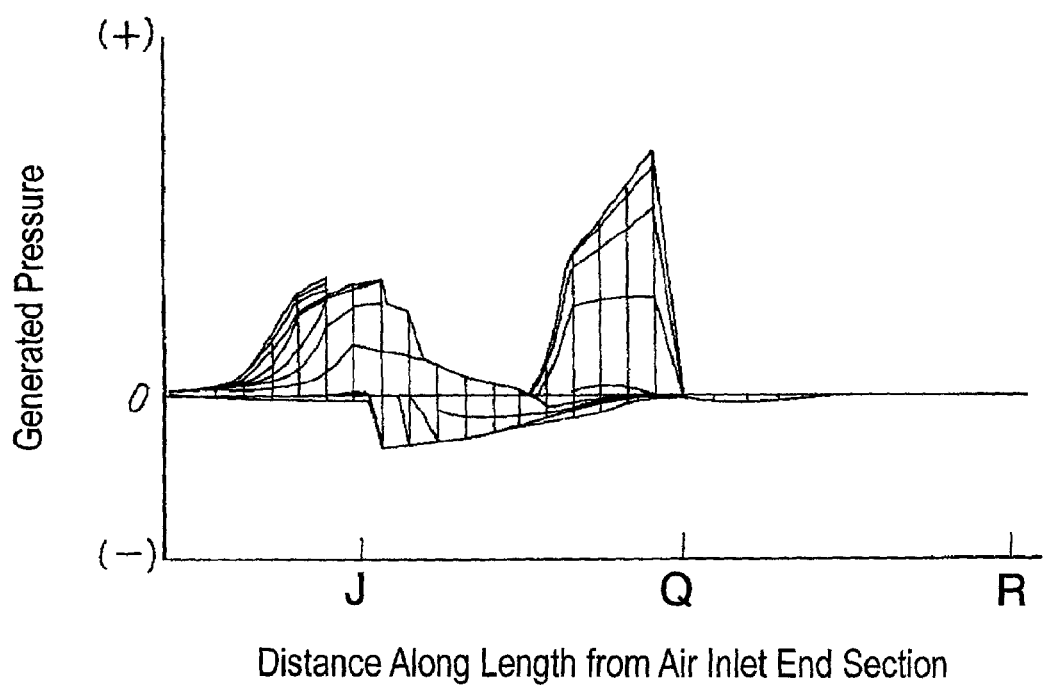
FIG. 10B is a pressure distribution drawing of the head slider while the same is steadily afloat over a disk.

Results of analysis of pressure distribution in such a state of steady floating are shown in FIG. 10B. Incidentally, reference characters J, Q, and R in FIG. 10A and FIG. 10B are given for ease of understanding the connection between the generated pressures and the relative positions in the head slider. As seen from the drawings, although positive pressures and negative pressures are generated at the section along first air-bearing face 60, only slight negative pressures are generated at the side of the air inlet end of the section along second air-bearing face 65. The positive pressures and the negative pressures being generated at the section along first air-bearing face 60 are virtually equal to those in the case of head slider 100 of the first embodiment shown in FIG. 4B and the effect produced by second air-bearing face 65 is very little. Accordingly, the floating characteristic at the time of steady floating is such that the attitude of head slider 400 is controlled by first air-bearing face 60.

The case at the time of unloading operation will now be described. When the load from the suspension is decreased for unloading, the positive pressure decreases immediately. Since an air inflow is produced from air outlet end section 32 to negative pressure generating recess 382, the negative pressure also decreases almost at the same time as the positive pressure decreases. As a result, unloading can be carried out reliably without giving the suspension an extra lifting force and without taking too long a stroke for the lifting, as was the case with head slider 100 of the first embodiment.

Figure 11A:
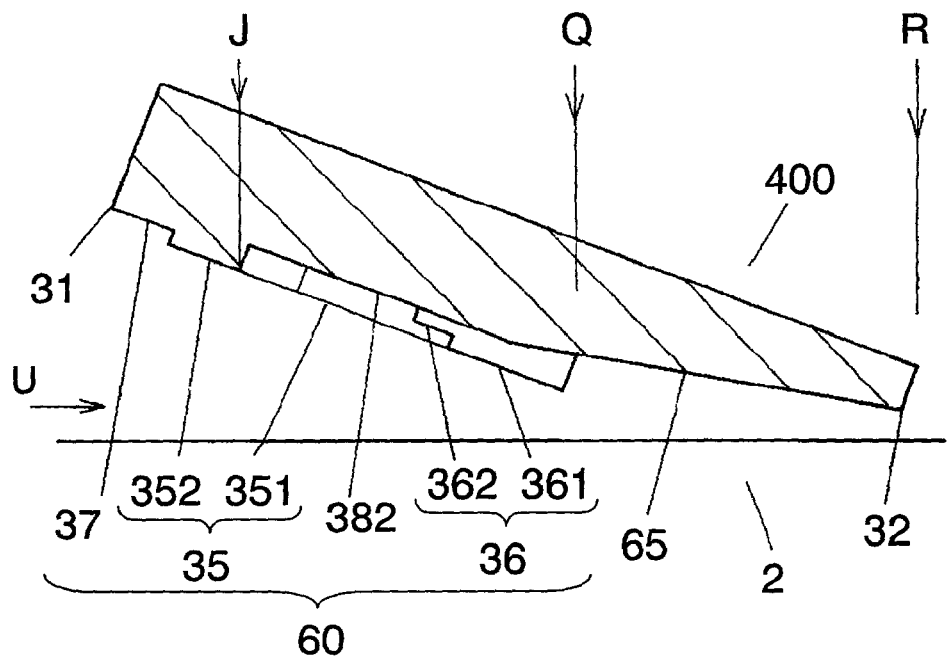
FIG. 11A is a cross-sectional view of the head slider when the same is loaded over the disk.

Further, even when the head slider is vibrated due to vibration of the suspension and, hence, the head slider is loaded over the disk surface in its state having a large pitch angle, a steady loading can be performed. FIG. 11A shows the relationship between head slider 400 and disk 2 when a loading operation is performed with the head slider at a large pitch angle. When the pitch angle is transiently increased as in this case, second air-bearing face 65 comes close to disk 2 to decrease its distance from the disk, thereby compressing air at that face and generating a positive pressure due to the effect of viscosity.

Figure 11B:
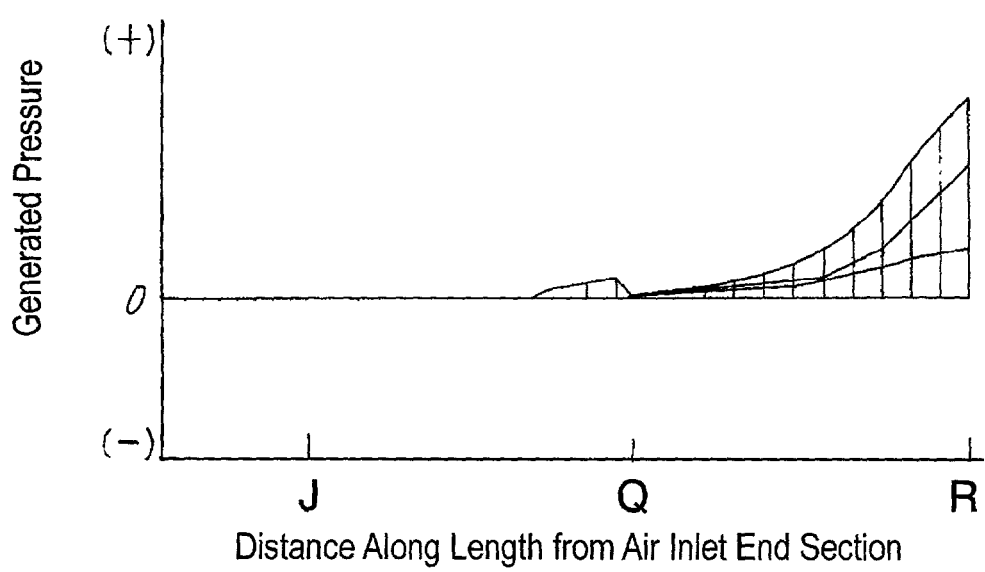
FIG. 11B is a pressure distribution drawing of the head slider when the same is loaded over a disk.
Figure 12A:
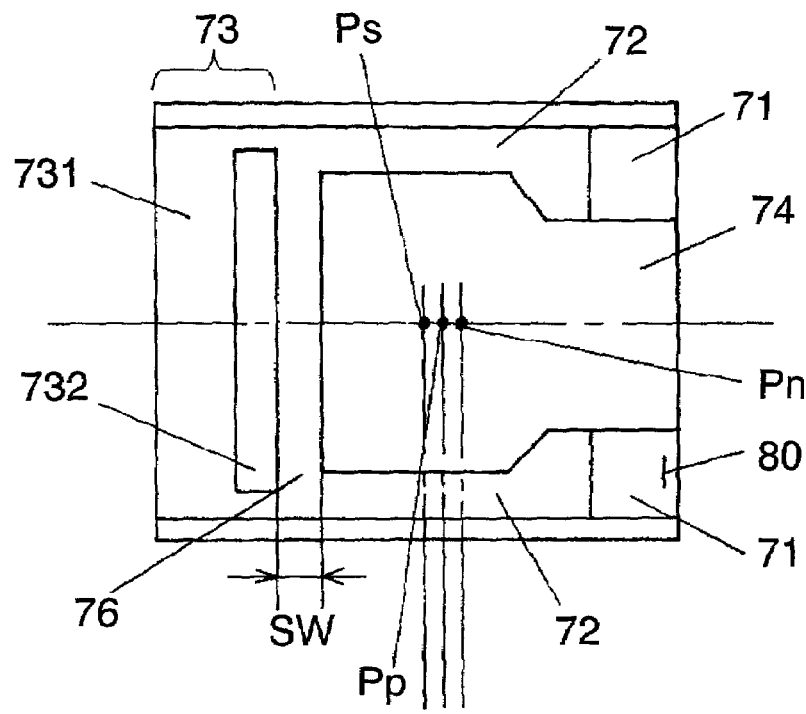
FIG. 12A is a plan view of a conventional head slider of the ramp loading type seen from the side of its face opposing a disk.
Figure 12B:
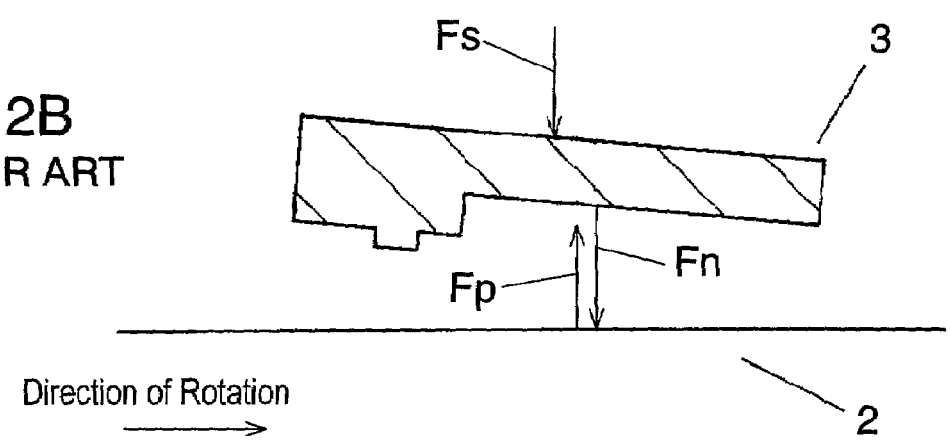
FIG. 12B is a cross-sectional view of the head slider while the same is afloat over a disk.

Results of analysis of pressure distribution at this time are shown in FIG. 11B. Incidentally, reference characters J, Q, and R in FIG. 11A and FIG. 11B are given for ease of understanding the connection between generated pressures and the relative positions in the head slider. As seen from the drawings, although virtually neither positive pressures nor negative pressures are generated at the section along first air-bearing face 60, great positive pressures are generated at the section along second air-bearing face 65. By virtue of the positive pressure generated at the section along second air-bearing face 65, head slider 400 is prevented from contacting disk 2 and allowed to be loaded with a certain floating height.

When vibration of the suspension is small, vibration of the head slider also becomes small, and loading of the head slider is performed with its pitch angle kept small. In this case, a positive pressure is generated at the section along first air-bearing face 60 as with the conventional head slider, and hence the head slider can be loaded without contacting disk 2. Therefore, in head slider 400 of the present embodiment, stable loading can be performed even if the pitch angle varies at the time of loading.

Head slider 400 of the present embodiment can provide enhanced stability at the time of loading/unloading. That is, even when an external impulse is given to the head slider to vary the pitch angle or roll angle of the head slider while it is steadily floating over the face of disk 2, a positive pressure is generated either on first air-bearing face 60 or on second air-bearing face 65. This positive pressure acts as a restoring force to keep the attitude of the head slider stabilized. As a result, a disk drive which is resistant to impulse and reliable can be provided.

In head slider 400 of the present embodiment, the second air-bearing face 65 is stated to be a flat sloped face extending to the air outlet end section. However, the same may be a sloped face extending to at least one of the disk inner edge side and the disk outer edge side. Otherwise, it may be a curved sloped face (similar to face 41 of FIG. 13) extending to at least one of the ends at the air outlet end section, the disk inner edge side, and the disk outer edge side. By forming the slope face in a curved shape, stability of the head slider against variation in the roll angle can be enhanced.

Although the angle formed between first air-bearing face 60 and second air-bearing face 65 in head slider 400 of the present embodiment is stated to be 0.9 mrad, the present invention is not limited to it. Design of the angle may be suitably changed within a range of angle larger than the pitch angle of the head slider with respect to the disk while it is steadily floating over the disk surface and smaller than the pitch angle produced by vibration of the suspension at the time of loading. Since, generally, the pitch angle during the steady state is from 0.05 mrad to 0.1 mrad and variation of pitch angle produced by vibration at the time of loading is from 1 mrad to 2 mrad, a range from 0.05 mrad to 2 mrad may preferably, or a range from 0.1 mrad to 1 mrad may more preferably, be selected as the range of the angle.

Further, in head slider 400 of the third embodiment, the size of second air-bearing face 65 is stated to be virtually equal to that of first air-bearing face 60. However, the invention is not limited to that size ratio. The size ratio between the second air-bearing face and the first air-bearing face allowing the second air-bearing face to fully exhibit its performance may be within a range of 1 to 0.05–1.0. However, if enhancement of stability at the time of loading, as well as allowance in designing, are considered, a ratio of 1 to 0.5–1.0 may be selected as a further preferable range.

Although, in the first to third embodiments of the present invention, head sliders with a flotation improving face provided at the air outlet end section have been described, the invention is not limited to the described configuration. For example, such a head slider may be used which has no flotation improving face provided thereon but has the side rails on both sides extended toward the side of the air outlet end and has a head provided at the outlet end section of one of the side rails. Further, such a configuration may be made in which the positive pressure improving intermediate-level face of the head slider is modified to form a planar sloped face from the air inlet end section to the cross rail so that an air flow is smoothly supplied to the cross rail. Further, suitable designing may be made for the positive pressure generating section and the negative pressure generating recess.

The disk drive to which the above described head slider is applicable is not limited to the apparatus with the ramp loading mechanism described in FIG. 2. The head slider may be applied to various types of disk drives on the NCSS system such as, for example, a type in which the head slider is vertically lifted from the disk surface at the time of unloading and, at the time of loading, shifted from a retreat position to over the disk surface and then lowered. Further, the head slider can be equally applied to such apparatuses, in which recording and playback is required to be made in the close vicinity to a disk, such as magnetic disk apparatus, magneto-optic disk apparatus, and optical disk apparatus.

The invention claimed is:
1. A head slider comprising:
    an air inlet end;
    an air outlet end;
    a disk inner edge side;
    a disk outer edge side; and
    a front surface for opposing a disk-shaped recording medium, said front surface including:
        a positive pressure generating section;
        a flotation improving section arranged to oppose the disk-shaped recording medium, said flotation improving section confronting said positive pressure generating section;

a negative pressure generating recess between said positive pressure generating section and said flotation improving section;

a head for performing at least one of a recording operation and a playback operation on the disk-shaped recording medium, said head being fixed at a downstream side of said flotation improving section; and a sloped face at both lateral sides of said head, and extending from a downstream side of said negative pressure generating recess to at least one of said air outlet end, said disk inner edge side, and said disk outer edge side, and being arranged such that a distance from the disk-shaped recording medium to said sloped face is gradually larger from an air inlet side of said sloped face toward an air outlet side of said sloped face when said head slider is steadily afloat over the disk-shaped recording medium.

2. The head slider of claim 1, wherein said positive pressure generating section comprises:

two side rails each spaced a predetermined distance from each of said disk inner edge side and said disk outer edge side, and each extending along a longitudinal axis of said head slider toward said air outlet end; and a cross rail having a main portion spaced a predetermined distance from said air inlet end and arranged perpendicular to the air flow direction, each end of said cross rail being connected to a respective one of said two side rails; and wherein said negative pressure generating recess comprises a lower-level face at a lower level than a face of said positive pressure generating section, and is surrounded by said positive pressure generating section and said flotation improving section; and wherein said flotation improving section is separated from said positive pressure generating section by said negative pressure generating recess, and is located at a laterally-central portion of said front surface at said air outlet end.

3. The head slider of claim 2, wherein said sloped face is a planar face extending from said downstream side of said negative pressure generating recess to said air outlet end.

4. The head slider of claim 2, wherein said sloped face is a curved face extending from a downstream side of said negative pressure generating recess to at least one of said air outlet end, said disk inner edge side, and said disk outer edge side.

5. The head slider of claim 1, wherein said sloped face is a planar face extending from said downstream side of said negative pressure generating recess to said air outlet end.

6. The head slider of claim 1, wherein said sloped face is a curved face extending from a downstream side of said negative pressure generating recess to at least one of said air outlet end, said disk inner edge side, and said disk outer edge side.

7. The head slider of claim 1, wherein said flotation improving section confronts said positive pressure generating section so as to be located downstream of said positive pressure generating section and at a laterally-central portion of said front face.

8. The head slider of claim 7, wherein said sloped face comprises an inner sloped face portion located at an inner-edge side of said flotation improving section, and comprises an outer sloped face portion located at an outer-edge side of said flotation improving section.

9. The head slider of claim 1, wherein said flotation improving section is located so as to divide said sloped face into an inner sloped face portion located at an inner-edge side of said flotation improving section, and an outer sloped face portion located at an outer-edge side of said flotation improving section.

10. The head slider of claim 1, wherein said positive pressure generating section comprises a high-level face and said negative pressure generating recess comprises a low-level face.

11. The head slider of claim 10, wherein said flotation improving section comprises a positive pressure improving face at a level in the same geometric plane as said high-level face of said positive pressure generating section, and comprises an intermediate level face at a level between said high-level face of said positive pressure generating section and said low-level face of said negative pressure generating recess.

12. The head slider of claim 1, wherein said front surface further includes a through-hole extending from said negative pressure generating recess to at least one of said disk inner edge side and said disk outer edge side.

13. The head slider of claim 12, wherein said positive pressure generating section comprises:

two side rails each spaced a predetermined distance from each of said disk inner edge side and said disk outer edge side, and each extending along a longitudinal axis of said head slider toward said air outlet end; and a cross rail having a main portion spaced a predetermined distance from said air inlet end and arranged perpendicular to the air flow direction, each end of said cross rail being connected to a respective one of said two side rails; and wherein said negative pressure generating recess comprises a lower-level face at a lower level than a face of said positive pressure generating section, and is surrounded by said positive pressure generating section and said flotation improving section; and wherein said flotation improving section is separated from said positive pressure generating section by said negative pressure generating recess, and is located at a laterally-central portion of said front surface at said air outlet end.

14. The head slider of claim 12, wherein said sloped face is a planar face extending from said downstream side of said negative pressure generating recess to said air outlet end.

15. The head slider of claim 12, wherein said sloped face is a curved face extending from a downstream side of said negative pressure generating recess to at least one of said air outlet end, said disk inner edge side, and said disk outer edge side.

16. A disk drive comprising:
a disk-shaped recording medium;
a driver for rotating said disk-shaped recording medium;
a suspension mechanism operable to swing around a bearing portion; and
a head slider attached to a distal end of said suspension mechanism such that said head slider opposes said disk-shaped recording medium during rotation of said disk-shaped recording medium, and such that said head slider is held at a retreat position when a rotation of said disk is stopped, said head slider including:
an air inlet end;
an air outlet end;
a disk inner edge side;
a disk outer edge side; and
a front surface for opposing said disk-shaped recording medium, said front surface including:
a positive pressure generating section;

a flotation improving section arranged to oppose said disk-shaped recording medium, said flotation improving section confronting said positive pressure generating section;

a negative pressure generating recess between said positive pressure generating section and said flotation improving section;

a head for performing at least one of a recording operation and a playback operation on said disk-shaped recording medium, said head being fixed at a downstream side of said flotation improving section; and a sloped face at both lateral sides of said head, and extending from a downstream side of said negative pressure generating recess to at least one of said air outlet end, said disk inner edge side, and said disk outer edge side, and being arranged such that a distance from said disk-shaped recording medium to said sloped face is gradually larger from an air inlet side of said sloped face toward an air outlet side of said sloped face when said head slider is steadily afloat over said disk-shaped recording medium.

17. The disk drive of claim 16, wherein said positive pressure generating section comprises:

two side rails each spaced a predetermined distance from each of said disk inner edge side and said disk outer edge side, and each extending along a longitudinal axis of said head slider toward said air outlet end; and a cross rail having a main portion spaced a predetermined distance from said air inlet end and arranged perpendicular to the air flow direction, each end of said cross rail being connected to a respective one of said two side rails; and wherein said negative pressure generating recess comprises a lower-level face at a lower level than a face of said positive pressure generating section, and is surrounded by said positive pressure generating section and said flotation improving section; and wherein said flotation improving section is separated from said positive pressure generating section by said negative pressure generating recess, and is located at a laterally-central portion of said front surface at said air outlet end.

18. The disk drive of claim 16, wherein said sloped face is a planar face extending from said downstream side of said negative pressure generating recess to said air outlet end.

19. The disk drive of claim 16, wherein said sloped face is a curved face extending from a downstream side of said negative pressure generating recess to at least one of said air outlet end, said disk inner edge side, and said disk outer edge side.

20. The disk drive of claim 16, wherein said flotation improving section is located so as to divide said sloped face into an inner sloped face portion located at an inner-edge side of said flotation improving section, and an outer sloped face portion located at an outer-edge side of said flotation improving section.

* * * * *

UNITED STATES PATENT AND TRADEMARK OFFICE
CERTIFICATE OF CORRECTION

PATENT NO. : 7,057,855 B2  Page 1 of 1
APPLICATION NO. : 10/003829
DATED : June 6, 2006
INVENTOR(S) : Yoshihiro Ueno et al.

It is certified that error appears in the above-identified patent and that said Letters Patent is hereby corrected as shown below:

ON THE TITLE PAGE

In the abstract, line 3, replace "slopping" with --sloping--.

Signed and Sealed this

Ninth Day of January, 2007

JON W. DUDAS
*Director of the United States Patent and Trademark Office*